(12) United States Patent
Barua

(10) Patent No.: US 7,809,735 B2
(45) Date of Patent: Oct. 5, 2010

(54) INFRASTRUCTURE FOR MORE EFFICIENT PROCESSING TO GENERATE OF AD-HOC REPORTS

(75) Inventor: Ankur Barua, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 261 days.

(21) Appl. No.: 11/548,640

(22) Filed: Oct. 11, 2006

(65) Prior Publication Data

US 2008/0091641 A1 Apr. 17, 2008

(51) Int. Cl.
*G06F 17/30* (2006.01)

(52) U.S. Cl. ....................... 707/754; 707/641
(58) Field of Classification Search ........................ None
See application file for complete search history.

(56) References Cited

U.S. PATENT DOCUMENTS

| 5,864,842 A * | 1/1999 | Pederson et al. ............... 707/3 |
| 6,567,803 B1 * | 5/2003 | Ramasamy et al. ............ 707/4 |
| 2004/0139061 A1 * | 7/2004 | Colossi et al. ................. 707/3 |
| 2006/0218123 A1 * | 9/2006 | Chowdhuri et al. ............ 707/2 |

* cited by examiner

*Primary Examiner*—Baoquoc N To
(74) *Attorney, Agent, or Firm*—Weaver Austin Villeneuve & Sampson LLP

(57) ABSTRACT

Reports, based on aggregation operations on data in a data warehouse, may be efficiently generated. At least two separate aggregation processes are performed on facts of a fact table. Each of a plurality of aggregation processors accesses a separate partition of the facts of the fact table. Each aggregation processor applies the at least two separate aggregation processes are applied to the partition of the facts accessed by that aggregation processor and, for each of the at least two separate aggregation processes, an intermediate result of applying that separate aggregation process by that aggregation processor is saved. For each of the at least two separate aggregation processes, the intermediate results, of applying the aggregation processing for that process by the aggregation processors, are merged.

18 Claims, 3 Drawing Sheets

INFRASTRUCTURE FOR MORE EFFICIENT PROCESSING TO GENERATE OF AD-HOC REPORTS

BACKGROUND

Many enterprises collect large amounts of facts on which they can base business decisions. For example, the facts may be contained in records that are "cookies," created by a browser as a result of particular actions of users with respect to web pages being processed by the browser. The facts may be characteristics of the particular actions such as, for example, which pages of a particular web site a user has visited. While these facts provide much information about the users' behavior, it can be difficult to process so many facts in order to glean the useful information, in order to make a particular business decision.

An "aggregation-type operation" may be performed to distill a large amount of facts (such as the facts contained in cookies) into some aggregate value that represents an aggregate of the large amount of facts, such that a business decision may be made based on the aggregate value. However, when an aggregation-type operation is to be performed on the large amount of facts, it can be very computationally intensive to access and process all of the available facts to accomplish the aggregation-type operation. This computational intensity is further exacerbated when multiple aggregation-type operations are to be performed on the same facts.

SUMMARY

In accordance with an aspect, a system architecture is provided in which reports, based on aggregation operations on data in a data warehouse, may be efficiently generated. At least two separate aggregation processes are performed on facts of a fact table. Each of a plurality of aggregation processors accesses a separate partition of the facts of the fact table.

Each aggregation processor applies the at least two separate aggregation processes are applied to the partition of the facts accessed by that aggregation processor and, for each of the at least two separate aggregation processes, an intermediate result of applying that separate aggregation process by that aggregation processor is saved. For each of the at least two separate aggregation processes, the intermediate results, of applying the aggregation processing for that process by the aggregation processors, are merged.

DETAILED DESCRIPTION

In accordance with an aspect, a system architecture is provided in which reports, based on aggregation operations on data in a data warehouse, may be efficiently generated.

Figure 1:
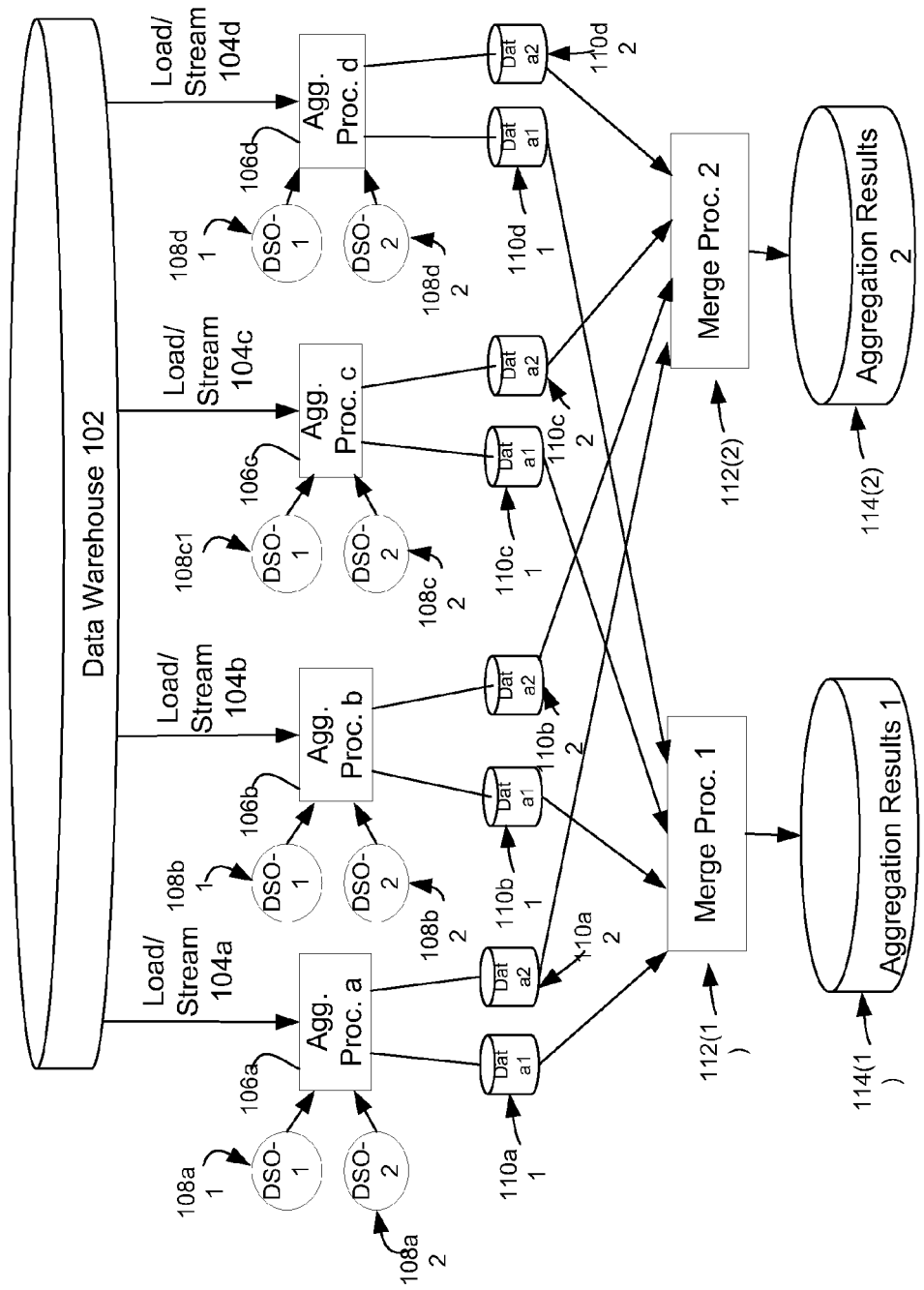
FIG. 1 is an architecture diagram illustrating an aspect in which an infrastructure may be substantially fixed, with aggregation processing to process one or more report queries being accomplished by specialized plug-in processing.

FIG. 1 illustrates an example architecture of such a system 100. A data warehouse 102 holds data on which it is desired to generate reports. The data warehouse 102 typically holds a very large amount of facts, such as greater than 100 GB of data. Furthermore, the facts held in the data warehouse 102 may comprise a large number of records. For example, each record may be a "cookie" that may be indicative of a single transaction by a user of services provided via a network, such as online service provided by Yahoo! Inc. of Sunnyvale, Calif., or that otherwise characterizes use of the services by the user.

As shown in FIG. 1, facts held in the data warehouse 102 is provided (typically by streaming, as indicated by arrows 104$a$ through 104$d$) on a partition basis to separate aggregation processors 106$a$ through 106$d$. In the example, four aggregation processors 106$a$ through 106$d$ are shown. There may be fewer or more such aggregation processors 106. Each aggregation processor 106 handles data aggregation operations on facts of a separate corresponding partition. Each aggregation processor 106 may be a single computing device but is not restricted to being so.

For example, the facts in the data warehouse 102 may be sorted according to a primary key, such as a user id associated with use of the online service, and the partitions may be according to the primary key. In this way, each aggregation processor 106 handles aggregation operations on facts for a unique range of primary keys. In some examples, however, the facts in the data warehouse 102 are not so sorted or, at least, are only partially sorted.

Each aggregation processor 106 has associated with it aggregation processing corresponding to each of a plurality of aggregation processes. The infrastructure is substantially fixed, whereas the plug-in processing 108 is customized to particular aggregation processing. In a particular example, the aggregation processing corresponding to each of a plurality of aggregation processes comprises plug-in processing, such as the pug-in processing 108$xn$, where each "x" corresponds to a designation of the aggregation processor 106 and "n" corresponds to a separate one of the aggregation processes. Thus, for example, plug-in processing 108$c2$ corresponds to the aggregation processor 106$c$ performing aggregation processing, for example, corresponding to a report query, on the partition 104$c$ of the data streamed from the data warehouse 102.

In one example, there is little buffering of facts within or associated with each aggregation processor 106 (e.g., due to the facts (104) provided from the data warehouse 102 being well-sorted). In other examples, facts are somewhat buffered within or associated with each aggregation processor 106 as appropriate in view of the plug-in processing 108 associated corresponding to that aggregation processor 106.

The results of processing by each plug-in processing 108$xn$ is stored into a corresponding datastore 110$xn$ where, again, "x" corresponds to a designation of the aggregation processor 106 and "n" corresponds to a separate one of the aggregation processes. A merge processor 112$n$ is provided for each of the plurality of aggregation processes, to merge the results of the processing by the various aggregation processors 106 for that aggregation process. The aggregation results are provided into aggregation results stores 114($n$). Depending on the extent to which the facts in the data warehouse 102 are sorted, the processing in or associated with the merge processors 112 may include additional ("second level") aggregation processing.

The architecture just described may be particularly useful in environments in which the aggregation processing tends to correspond to "ad hoc" report queries and/or, furthermore, more than one aggregation process is to be carried out on the same or similar data from the data store. With regard to the "ad hoc" nature of the report query and, therefore, of the aggregation processing, in general, the plug-in processing 108xn would be customized to correspond to the aggregation processing for a desired report query, while the remainder of the processing of the system 100 would be stable. As an example, the ad hoc report query may seek to determine engagement metrics (such as the time spent) relative to one or more particular properties.

Furthermore, there is typically a large amount of data from the data warehouse 102 being processed, and access to such data (e.g., by loading or streaming) is typically expensive. With the plug-in processing 108 for the plurality of aggregation processes being associated with each aggregation processor 106, expensive overhead to access the facts from the data warehouse 102 may be avoided and/or minimized.

Figure 2:
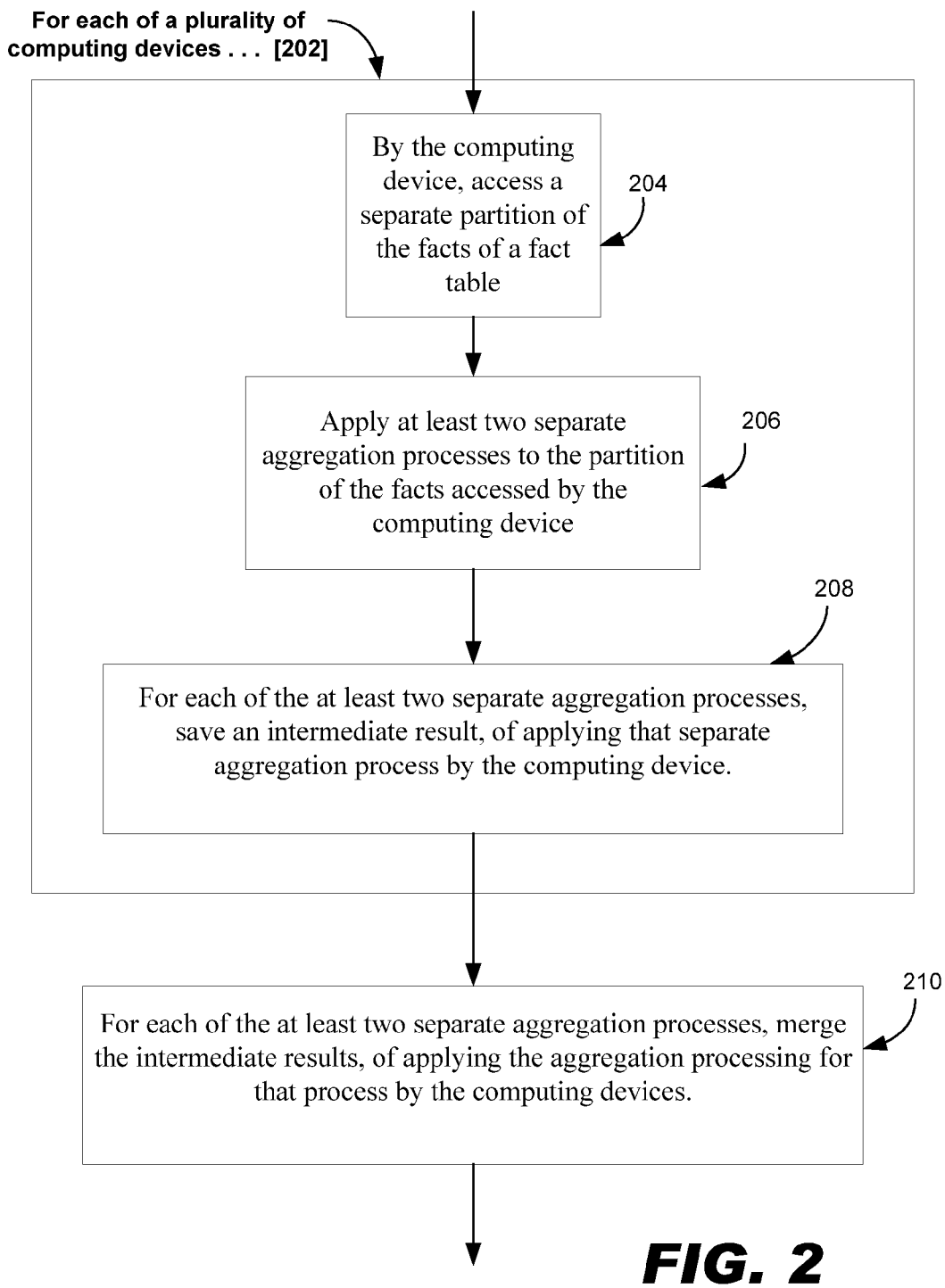
FIG. 2 is a flowchart illustrating an example of steps of operation of the FIG. 1 infrastructure.

To further illustrate the FIG. 1 architecture, FIG. 2 is a flowchart illustrating an example of a method 200 by which a system of the FIG. 1 architecture accomplishes aggregation operations on facts of the data warehouse 102. Reference numeral 202 indicates processing that is carried out for each of a plurality of the aggregation processors 106. At step 204, each of the plurality of aggregation processors 106 accesses a separate portion of the facts of the data warehouse 102. At step 206, at least two separate aggregation processes are applied (e.g., by the plug-in processing 108) to facts accessed by the aggregation processor 206 with which the aggregation processes are associated.

At step 208, for each of the at least two applied separate aggregation processes, an intermediate result of applying that aggregation process is saved. At step 210, for each separate aggregation process, the intermediate results saved for that aggregation process are merged, to accomplish an overall result for that aggregation process.

As discussed above, the aggregation processing may be "ad hoc." That is, the report queries to which the aggregation processing corresponds may be for a specific purpose rather than as part of a general plan in which the report query is intended to be periodically or otherwise repeated. Given the relatively fixed structure of the system 100, the functionality system is relatively simply customized for processing corresponding to a particular ad hoc report query by providing the appropriate plug-in processing 108 corresponding to that report query.

Figure 3:
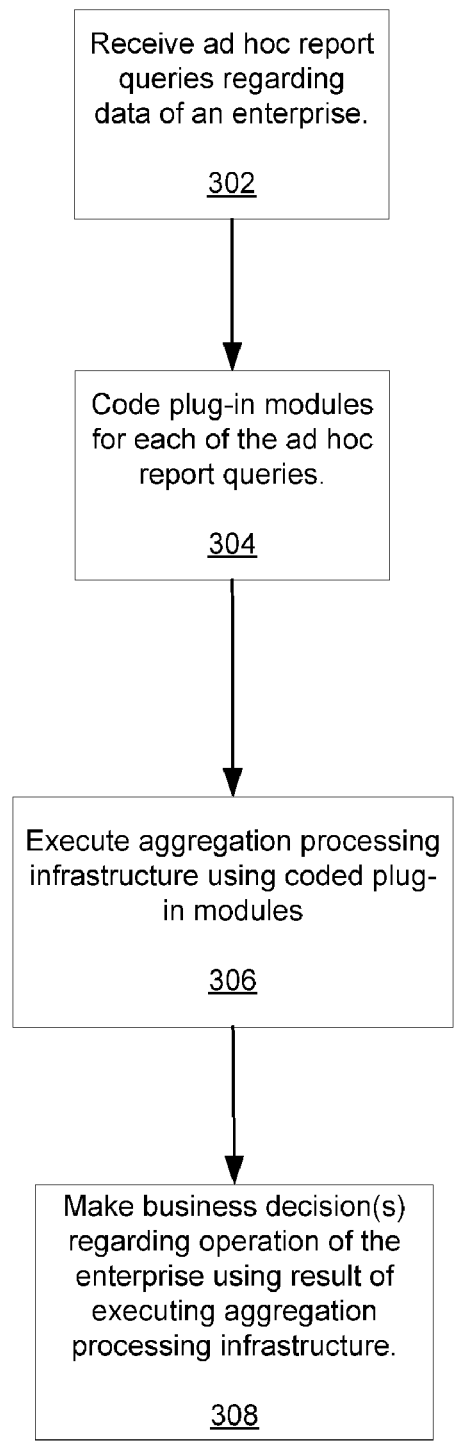
FIG. 3 is a flowchart illustrating steps of processing to configure the FIG. 1 infrastructure.

FIG. 3 is a flowchart that illustrates steps to configure the FIG. 1 infrastructure. At step 302, ad hoc report queries are received. For example, the report queries may be submitted by people such as "business people" of an enterprise, including those having responsibility for determining the strategic direction of the enterprise. At step 304, an analyst codes plug-in modules (i.e., the plug-in processing 108 shown in FIG. 1) corresponding to the aggregation processing to accomplish processing the ad hoc report queries.

In general, particular plug-in processing 108 (i.e., to accomplish processing a particular ad hoc report query for a particular aggregation processor 106) is replicated for each aggregation processor, such that each aggregation processor 106 accomplishes the aggregation processing, for the particular ad hoc report query, for the partition 104 of data accessed by that aggregation processor 106. At step 306, the aggregation processing is accomplished by the infrastructure, including executing the coded plug-in processing 108. At step 308, a business decision is made using a report generated as a result of the step 306 processing.

It can thus be seen that, using the FIG. 1 infrastructure, ad hoc report queries can be efficiently handled. Moreover, infrastructure is such that, where multiple ad hoc report queries utilize the same data, data access operations for the aggregation processing involved in processing the multiple report queries may be handled more efficiently by minimizing the overhead associated with accessing the data.

What is claimed is:

1. A method, comprising:
by each of a plurality of aggregation processors,
   accessing a separate partition of facts of a fact table;
   applying at least two separate aggregation processes to the partition of the facts accessed by that aggregation processor, wherein the at least two separate aggregation processes applied to the partition of the facts accessed by that aggregation processor are the same at least two separate aggregation processes being applied by the each of the other aggregation processors to the partition of facts accessed by that other aggregation processor; and
   for each of the at least two separate aggregation processes, saving an intermediate result of applying that separate aggregation process by that aggregation processor;
for each of the at least two separate aggregation processes, merging the intermediate results, of applying the aggregation processing for that process by the aggregation processors,
wherein, for each of the at least two separate aggregation processes, the intermediate result of applying that separate aggregation process includes a distillation of the facts of the partition of facts to which that aggregation process is applied, into an aggregate value that represents an aggregate of the facts of the partition of facts.

2. The method of claim 1, wherein:
the step of saving an intermediate result, of applying that separate aggregation process by that aggregation processor, includes providing the intermediate result as a sorted intermediate result.

3. The method of claim 1, wherein:
accessing a separate partition of the facts of the fact table includes streaming the facts of the separate partition from a data warehouse to that computing device.

4. The method of claim 3, further comprising:
by at least some of the separate aggregation processes, buffering at least some of the accessed separate partition of the facts of the fact table.

5. The method of claim 1, wherein:
the step of merging the intermediate results for a particular one of the at least two separate aggregation processes includes performing further aggregation processing with respect to those intermediate results.

6. The method of claim 1, further comprising:
initially preparing the aggregation processes in view of desired ad hoc report queries.

7. The method of claim 1, wherein:
the facts of the fact table are contained in records of the fact table, and
the records of the fact table each represent a transaction of a user with respect to an online property.

8. A computing system, comprising:
a plurality of aggregation processors, each of the aggregation processors configured to:
   access a separate partition of facts of a fact table;
   apply at least two separate aggregation processes to the partition of the facts accessed by that aggregation processor, wherein the at least two separate aggregation processes applied to the partition of the facts accessed by that aggregation processor are the same at least two separate aggregation processes being applied by the each of the other aggregation processors to the partition of facts accessed by that other aggregation processor; and for each of the at least two separate aggregation processes, save an intermediate result of applying that separate aggregation process by that aggregation processor;

for each of the at least two separate aggregation processes, a merging processor configured to merge the intermediate results of applying the aggregation processing for that process by the aggregation processors, wherein, for each of the at least two separate aggregation processes, the intermediate result of applying that separate aggregation process includes a distillation of the facts of the partition of facts to which that aggregation process is applied, into an aggregate value that represents an aggregate of the facts of the partition of facts.

9. The computing system of claim 8, wherein:

each of the aggregation processors configured to save an intermediate result, of applying that separate aggregation process by that aggregation processor, includes each of the aggregation processors being configured to provide the intermediate result as a sorted intermediate result.

10. The computing system of claim 8, wherein:

each of the aggregation processors configured to save access a separate partition of the facts of the fact table includes each of the aggregation processors configured to stream the facts of the separate partition from a data warehouse to that aggregation processor.

11. The computing system of claim 10, wherein:

the aggregation processors are configured to operate such that at least some of the separate aggregation processes cause at least some of the accessed separate partition of the facts of the fact table to be buffered.

12. The computing system of claim 8, wherein:

the merging processor is configured to merge the intermediate results for a particular one of the at least two separate aggregation processes including being configured to perform further aggregation processing with respect to those intermediate results.

13. The computing system of claim 8, wherein:

the aggregation processes correspond to desired ad hoc report queries.

14. The computing system of claim 8, wherein:

the facts of the fact table are contained in records of the fact table, and the records of the fact table each represent a transaction of a user with respect to an online property.

15. The method of claim 1, wherein each of the at least two separate aggregation processes corresponds to a separate one of two or more report queries.

16. The method of claim 15, wherein merging is performed by at least one merging processor, thereby enabling the merging processor to generate reports based upon the report queries.

17. The method of claim 16, further comprising:

making at least one business decision regarding operation of the enterprise based at least in part on the generated reports.

18. An apparatus, comprising:

a processor; and a memory, at least one of the processor or the memory being adapted for:

accessing only one of a plurality of partitions of facts of a fact table;

applying at least two separate aggregation processes to the partition of the facts accessed by the processor, wherein the at least two separate aggregation processes applied to the partition of the facts accessed by the processor are the same at least two separate aggregation processes being applied by each of one or more other processors to the remaining partitions of the plurality of partitions of facts, wherein each of the one or more other processors accesses a different one of the remaining partitions of the plurality of partitions of facts; and for each of the at least two separate aggregation processes, saving an intermediate result of applying that separate aggregation process by the processor;

wherein, for each of the at least two separate aggregation processes, the intermediate result of applying that separate aggregation process includes a distillation of the facts of the partition of facts to which that aggregation process is applied, into an aggregate value that represents an aggregate of the facts of the partition of facts.

* * * * *